Sept. 20, 1949.   L. A. KILGORE   2,482,491
MOTOR
Filed Oct. 19, 1945
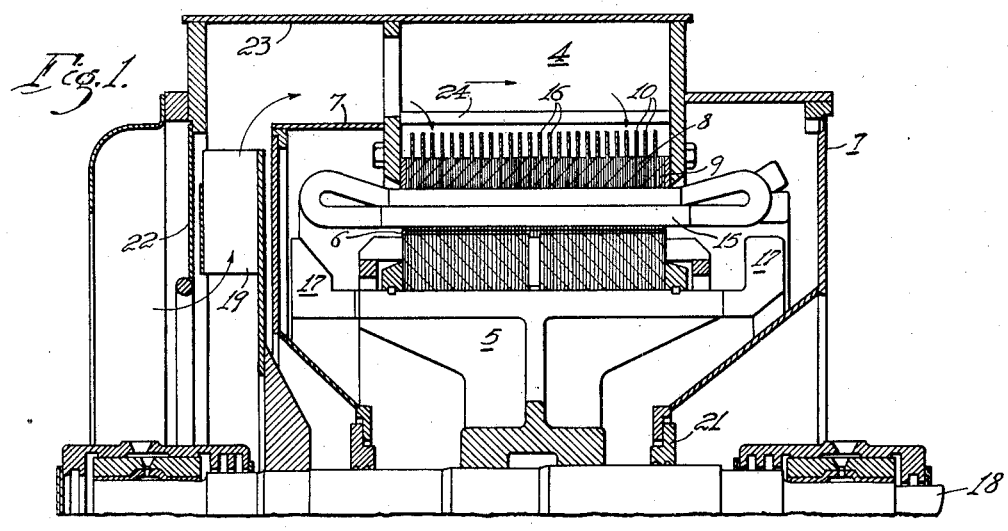
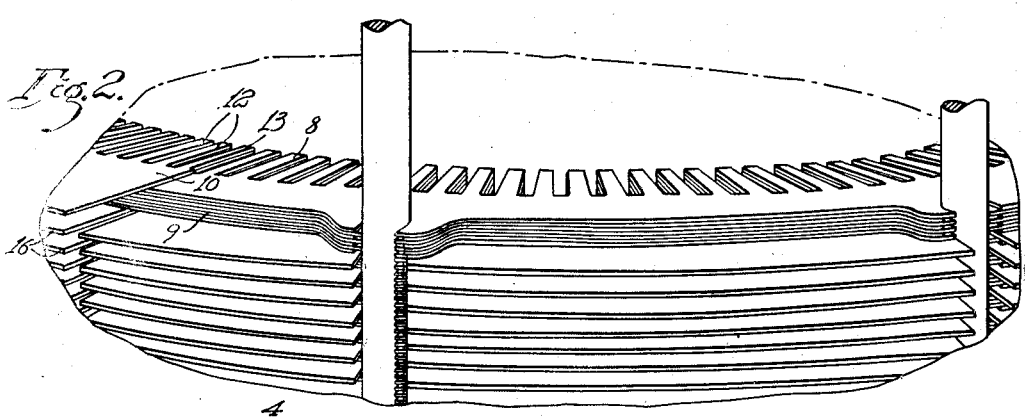
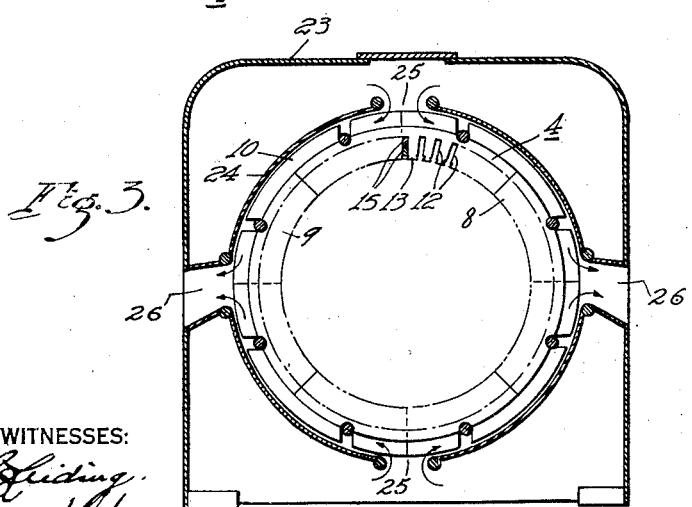
WITNESSES:
INVENTOR
Lee A. Kilgore.
BY O. B. Buchanan
ATTORNEY Patented Sept. 20, 1949

2,482,491

UNITED STATES PATENT OFFICE 2,482,491

MOTOR

Lee A. Kilgore, Wilkinsburg, Pa., assignor to Westinghouse Electric Corporation, East Pittsburgh, Pa., a corporation of Pennsylvania Application October 19, 1945, Serial No. 623,372

6 Claims. (Cl. 171—252)

My invention relates to totally enclosed, fan-cooled, alternating-current motors, having specially designed annular stator-cores and a special external ventilating circuit, for increasing the rate at which heat is withdrawn from the stator conductors.

My invention is particularly related to the larger sizes of totally enclosed, fan-cooled, alternating-current motors, because the kilowatt loss, in these motors, increases about as the 3.5 power of the diameter, whereas the heat-radiating surface increases as the diameter squared. Consequently, if these larger sizes of motors are designed in accordance with the normal design of motors, differing only in making them larger, for larger ratings, the machines must be very much underrated, proportionately to their size or volume, in order to prevent overheating.

When the requirement is added, that the motor must be totally enclosed, this requirement has usually meant an overall motor-size which is just about double the size required for open motors of the same rating, particularly in the larger ratings.

An object of my present invention is to provide an improved ventilating-means which makes it possible to build a totally enclosed, fan-cooled motor which is only slightly larger than an open motor of the same rating, instead of the present designs requiring nearly double size, in large, totally enclosed, fan-cooled motors.

A more specific object of my invention is to provide a fan-cooled motor in which the stationary member has an annular stator-core comprising a stack of magnetizable punchings interspersed with a relatively small number of punchings of higher heat-conductivity than the material of the magnetizable punchings, with the high-heat-conductivity punchings sticking out of the outer periphery in the form of fins. The motor is totally enclosed, and cooled by a fan which blows air axially over the motor, with means for directing the air so as to flow circumferentially over the fins and thence out of the motor.

With the foregoing and other objects in view, my invention consists in the combinations, assemblies, apparatus, parts, and methods hereinafter described and claimed, and illustrated in the accompanying drawing, wherein:

Figure 1 is a vertical longitudinal sectional view of a motor embodying my invention, Fig. 2 is a detail perspective view showing a part of the stator-core in process of manufacture, and Fig. 3 is a central transverse section through the stator member.

In the drawing, I show a fan-cooled alternating-current motor having a stationary member 4 and a rotor member 5, separated by an airgap 6, the stationary member comprising two end-bracket housing-means 7, for totally enclosing the motor at both ends, and an annular stator-core 8, which is disposed between the two end-bracket housing-means 7. The annular stator-core 8 thus provides the central peripheral part of the means which totally encloses the motor. The annular stator-core 8 comprises a stack of magnetizable punchings 9, interspersed with a relatively small number of punchings 10 of a material of higher heat-conductivity than the material of the magnetizable punchings 9. All these punchings 9 and 10 have winding-receiving slots 12 in their bores 13 which border on the airgap 6, and a stator winding is provided, having coil-sides 15 lying in said slots 12. The punchings 10 of relatively high heat-conductivity are radially deeper than the magnetizable punchings 9, so that the high-heat-conductivity punchings 10 provide fins 16 which stick out of the outer periphery of the stator-core 8.

Aside from the very expensive metals, which would not be economically justifiable, there are, practically speaking, only two or three metals, or types of metals, which are suitable for the relatively high-heat-conductivity punchings 10. These metals are copper, aluminum or aluminum alloy, and possibly magnesium. The relative thermal conductivities of copper, aluminum, and the core-iron of which the magnetizable punchings 9 are made, are shown in the following table, with the heat-conductivity of iron expressed as unity, for purposes of comparison. The thermal conductivities are expressed first on a volume-basis, and second on a weight-basis.

|  | Thermal Conductivity on a Volume Basis | Thermal Conductivity on a Weight Basis |
|---|---|---|
| Copper | 10.8 | 9.3 |
| Aluminum | 5.9 | 16.7 |
| Core-Iron | 1.0 | 1.0 |

Copper has the advantage of the higher thermal conductivity, for the given volume of space. Its thermal conductivity, size for size, is nearly eleven times that of the magnetizable material of the magnetizable punchings 9. Thus, if the high-heat-conductivity punchings 10 are made of copper, (preferably hard copper for ease in punching), and if the copper punchings 10 are of approximately the same thickness as the iron punchings 9, so that the same dies can be utilized to punch both materials, one copper punching might be utilized for every ten iron punchings, for example, in which case the length of the stator-core 8 would be increased by 10%, but its radial heat-conductivity would be approximately doubled, while the effective heat-transfer surface, for exchanging the heat with the externally ventilated air, would be very much increased by the provision of the fins 16.

If aluminum, or an aluminum alloy, were utilized as the material for the high-heat-conductivity punchings 10, the number, or the total thickness, of the aluminum punchings 10 would have to be nearly twice that of the equivalent copper punchings, for an equivalent radial heat-conductivity through the stator-core 8, which means that the stator-core 8 would be longer axially, meaning more copper in the windings 15, and hence more resistance-losses in the machine, but the overall weight of the machine would perhaps be lighter, in applications where corrosion of salt air, or the like, would permit the use of aluminum or aluminum alloy.

Magnesium could also be utilized, in place of aluminum, requiring a still greater percentage of core-material for the magnesium punchings, but having an advantage in its considerably lower density or weight.

While I am not limited to any exact proportions, it is advantageous to utilize approximately a volume of high-heat-conductivity punchings 10 which will give the same total thermal conductivity as the iron or magnetizable punchings 9, so that all of the heat of the stator may readily be removed by the high-heat-conductivity punchings 10, while the greater radial depth of these punchings provides heat-radiating fins 16 which offer a very greatly increased heat-transfer surface, for transferring the heat to the circumferentially circulated outer air.

As a generalization, it may be said that the high-heat-conductivity material of the punchings 10 has a heat-conductivity greater than eight times that of the magnetizable punching-material, on either a weight-basis, or a volume-basis, or preferably both, copper meeting these requirements on both bases, while aluminum and magnesium meet the requirements on a weight comparison.

The rotor member 5 has two interval fan-means 17 for providing an internal circulation of a gaseous cooling medium within the respective totally enclosing end-bracket housing-means 7. The rotor member 5 also has a shaft 18, having two ends, one or both of which extend through the housing-means 7, and an external fan 19 is carried by one of the shaft-ends, outside of the motor-enclosure. The housing-means 7 has a sealing-means 21 for limiting the infiltration of air at the point where the shaft 18 passes through the housing. The stationary member 4 of the motor also has an external air-guiding means for directing the air from the external fan 19, in various ways, said external air-guiding means including an outer end-frame 22 for delivering the air from the external fan 19 to the outer periphery of the stator-core 8, which forms a part of the totally enclosed machine-housing. The external air-guiding means also includes an outer frame-casing 23 which provides an air-chamber all of the way around the stator-core 8. Inside of the outer frame-casing 23, between this casing and the outer periphery of the stator-core 8, I provide a plurality of circumferentially spaced, circumferentially extending baffles 24 which are closely spaced from both the stator-core 8, and more widely spaced from the outer frame-casing 23.

The ventilating arrangement is such that the external cooling air, which is blown by the external fan 19, as shown by the arrows, flows axially within the space between the outer frame-casing 23 and the circumferentially extending baffles 24, thence radially inwardly around an air-inlet end of the circumferentially extending baffles 24, through an air-inlet space or spaces 25 between certain pairs of baffles 24, and then circumferentially around the periphery of the stator-core 8, or around as much of the periphery as is covered by the length of the circumferentially extending baffles 24. Some or all of the circumferentially spaced, circumferentially extending baffles 24 have exit ends, defining outlet-spaces or ducts 26, through which the external ventilating-air is discharged out of the machine, from the circumferential spaces 26 between certain pairs of baffles 24.

In operation, the stator-core 8 is well cooled, by my invention, by means of the copper or aluminum punchings 10 which extend all the way in, to the airgap 6, so as to carry heat directly away, radially, from the stator-winding conductors 15. The copper or aluminum punchings 10 also absorb heat from the adjacent bundles of iron punchings 9, conducting the heat out to the fins 16 on the outer periphery of the stator-core 8, where the heat is removed by the external ventilating-air, as above described. The rotor member 5 is cooled by its own internal ventilation, produced by the two rotor fan-means 17, which circulate the internal air of the motor, which is enclosed by the respective totally enclosing end-bracket housing-means 7. Since the stator-core 6 forms a portion of the enclosure-wall of the machine, the internal rotor-ventilation also benefits by the reduction in the stator-temperature which is brought about by my stator-ventilating punchings 10 and fins 16, in combination with the special external-ventilation air-directing baffles for producing the circumferential air-flow around the outer periphery of the stator-core 8.

A machine which is constructed in accordance with my present invention is thus lighter, and requires less floor-space, than other previously-known, totally enclosed machines, and this advantage becomes more and more distinctive and important, the larger the machine, so that the invention has a particular advantage for enclosed fan-cooled motors of large ratings.

While I have described my invention in a preferred form of embodiment, and while I have suggested preferred design limits, I wish it to be understood that my invention is not limited to these details, and that various changes may be made by those skilled in the art, in the way of substitutions, additions, omissions, and choice of design-proportions and limits. I desire, therefore, that the appended claims shall be accorded the broadest construction consistent with their language.

I claim as my invention:

1. A fan-cooled alternating-current motor having a stationary member and a rotor member separated by an airgap, the stationary member comprising two end-bracket housing-means, for totally enclosing the motor at both ends, and an annular stator-core, disposed between the two end-bracket housing-means, said annular stator-core comprising a stack of magnetizable punchings interspersed with a relatively small number of punchings of a material of higher heat-conductivity than the material of the magnetizable punchings, all of said punchings having winding-receiving slots in their bores, a stator winding having coil-sides lying in said slots, the punchings of relatively high-heat-conductivity being radially deeper than the magnetizable punchings, whereby the high-heat-conductivity punchings provide fins sticking out of the outer periphery of the stator-core, the rotor member having internal fan-means for providing an internal circulation of a gaseous cooling medium within the respective totally enclosing end-bracket housing-means, the rotor member having a shaft-end which extends through said housing-means, and an external fan on said shaft-end, said housing-means having a sealing means for limiting the infiltration of air at the point where the shaft-end passes through the housing, and external air-guiding means for directing the air from said external fan, said external air-guiding means including an outer frame-casing which provides an air-chamber outside of the annular stator-core, and inner circumferential air-guiding baffle-means having air-inlet and air-outlet opening-means, for directing air, from said external fan, first axially over the outside of said baffle-means, and then radially inwardly through said air-inlet opening-means, and then circumferentially around the outer periphery of said stator-core, and then out of the machine through said air-outlet opening-means.

2. The invention as defined in claim 1, characterized by said high-heat-conductivity material having a heat-conductivity greater than eight times that of the magnetizable punching-material, on a weight-basis.

3. The invention as defined in claim 1, characterized by said high-heat-conductivity material having a heat-conductivity greater than eight times that of the magnetizable punching-material, on a volume-basis.

4. The invention as defined in claim 1, characterized by said high-heat-conductivity material being copper.

5. The invention as defined in claim 1, characterized by said high-heat-conductivity material being a metal which is basically aluminum.

6. The invention as defined in claim 1, characterized by said high-heat-conductivity material being a metal which is basically magnesium.

LEE A. KILGORE.

REFERENCES CITED

The following references are of record in the file of this patent:

UNITED STATES PATENTS

| Number | Name | Date |
|---|---|---|
| 1,080,611 | Wait | Dec. 9, 1913 |
| 1,794,029 | Pfleger | Feb. 24, 1931 |
| 2,353,235 | Hamilton | July 11, 1944 |

FOREIGN PATENTS

| Number | Country | Date |
|---|---|---|
| 433,209 | Germany | Aug. 1926 |
| 358,246 | Italy | Apr. 9, 1938 |